United States Patent [19]

Martin

[11] Patent Number: 6,088,418
[45] Date of Patent: Jul. 11, 2000

[54] POOL PRESSURE MITIGATION USING SPARGER PHASE INTERACTION

[75] Inventor: Clifford B. Martin, Somers, Conn.

[73] Assignee: ABB Combustion Engineering Nuclear Power, Inc., Windsor, Conn.

[21] Appl. No.: 09/139,106

[22] Filed: Aug. 25, 1998

[51] Int. Cl.[7] .................................................. G21C 9/00
[52] U.S. Cl. ........................ 376/283; 261/64.3; 261/124
[58] Field of Search ........................ 376/283; 261/64.3, 261/124

[56] References Cited

U.S. PATENT DOCUMENTS

| | | | |
|---|---|---|---|
| 4,022,655 | 5/1977 | Gaouditz et al. | 376/283 |
| 4,252,611 | 2/1981 | Mizumachi et al. | 376/283 |
| 4,446,081 | 5/1984 | Arinobu | 376/283 |
| 4,526,743 | 7/1985 | Yamanari et al. | 376/283 |

OTHER PUBLICATIONS

*Modern Compressible Flow With Historical Prespective,* by John D. Anderson, Jr., McGraw–Hill Book Company, Chapter Seven "Unsteady Wave Motion", pp. 172–179, (1982).

*Transport Phenomena,* by R. Byron Bird, Warren E. Stewart, and Edwin N. Lightfoot, John Wiley & Sons, "Macroscopic Balances for Isothermal Systems", pp. 224–227, (1960).

*Primary Examiner*—Harvey E. Behrend
*Attorney, Agent, or Firm*—Rader, Fishman & Grauer; Ronald P. Kananen

[57] ABSTRACT

A method and apparatus for mitigating oscillatory pressure disturbances that result from venting steam from a nuclear reactor into a pressure suppression pool through a plurality of spargers is disclosed. The individual spargers are connected in series so that a time delay exists between first venting of noncondensable gas and steam from successive spargers. This time delay can be adjusted so that the pressure disturbances from successive spargers are out of phase, partially or wholly canceling one another. This cancellation of oscillatory pressure disturbances minimizes dynamic loads on the walls of the suppression pool and on structures submerged in the suppression pool.

30 Claims, 10 Drawing Sheets

$\phi 2 = \pi/3$ $\phi 2 = 2\pi/3$ $\phi 2 = 5\pi/3$ $\phi 2 = 2\pi$ f2=0.95 f2=1.05 f2=1.1 f2=1.5

1 Sparger

2 Spargers

3 Spargers

4 Spargers

5 Spargers

6 Spargers

POOL PRESSURE MITIGATION USING SPARGER PHASE INTERACTION

BACKGROUND OF THE INVENTION

1. Field of Invention

The present invention relates generally to an apparatus and method for controlled de-pressurization of a nuclear reactor, and more particularly, to an improved gas sparging system for reducing loads acting on structures submerged in a suppression pool.

2. Discussion

In the event of over-pressurization of a nuclear reactor, relief valves may vent steam or reactor coolant into a suppression pool—a tank filled with liquid coolant—to dissipate the energy of the vented steam. The relief valve's abrupt opening, and subsequent delivery of high-pressure steam to the suppression pool, results in dynamic loads on suppression pool walls and structures. These dynamic loads, if large enough and if not properly accounted for during plant design, can damage structures submerged in the suppression pool.

Dynamic loads within the suppression tank are thought to occur through at least two different mechanisms. In a typical pressure relief system, a relief valve exhausts high pressure steam into a discharge line, which is connected to a group of gas spargers. The spargers generally consist of vertical pipes whose ends are submerged in the suppression pool. When the pressure relief valve vents high pressure steam into the exhaust line, the steam must first displace noncondensable gas and liquid coolant present in the sparger pipe. During this sparger line clearing process, the high pressure steam compresses the noncondensable gas because of the relatively large inertia and high flow resistance of the liquid coolant. As the compressed noncondensable gas emerges from the sparger nozzles, it expands rapidly and then contracts due to over expansion. The expansion and contraction of the non-condensable gas repeats during the line clearing process, resulting in oscillatory pressure waves that impact submerged structures within the suppression pool.

At some point after the liquid coolant has cleared the sparger pipe, the sparger injects high pressure steam into the suppression pool, creating a vapor-phase injection zone adjacent to the sparger nozzles (in practice there appears to be no clear transition between non-condensable gas venting and steam venting). Because of time-dependent imbalances between the steam mass flux and condensation rate, the high pressure steam injection process results in pressure oscillations. Like the line clearing process, oscillatory pressure waves during steam injection give rise to dynamic pressure loads on submerged structures within the suppression pool.

In many conventional pressure relief systems, the gas spargers simultaneously exhaust steam into the liquid coolant at different locations, which distributes pressure forces acting on submerged structures within the suppression pool. But, dynamic loads on submerged structures can still be large because pressure disturbances from different spargers can combine. For example, if pressure disturbances from two adjacent spargers have the same frequency and phase relationship, the amplitude of the two pressure disturbances will add, resulting in a combined pressure disturbance that is greater than the individual pressure disturbances. Thus, pressure relief systems that take into account the interaction of pressure disturbances from individual spargers in order to minimize dynamic loads on structures within the suppression pool would be desirable.

SUMMARY OF THE INVENTION

In accordance with one aspect of the present invention, there is provided a method of mitigating pressure disturbances resulting from venting gas through a series of spargers into a suppression pool. The method comprises the steps of obtaining fundamental frequencies of the pressure disturbances arising at each of the spargers, and adjusting the time delay between the start of gas venting of any two successive spargers in order to optimize at substantially the following relation:

$$\left| \tau f - \left( \frac{1 + 2m}{2} \right) \right| \leq \frac{1}{6},$$

where $\tau$ represents the time delay and f represents the fundamental frequency of the disturbance at the later venting sparger.

In accordance with another aspect of the present invention, there is provided a second method of mitigating pressure disturbances resulting from venting gas through a series of N spargers submerged in a suppression pool. The method comprises the steps of obtaining fundamental frequencies of the pressure disturbances arising at each of the spargers, and adjusting phase angles of the disturbances at two successive spargers so that they optimize at substantially the relation $$||\phi_i - \phi_{i-1}| - (1 + 2m)\pi| \leq \frac{\pi}{3},$$

where $\phi_i$ and $\phi_{i-1}$ represent the phase angles of the disturbances at two successive spargers, i is an integer greater than one and less than or equal to N and denotes the serial position of the sparger, and m is a positive integer greater than or equal to zero. The step of adjusting the phase angles to satisfy the phase angle relationship is repeated for every pair of successive spargers.

In accordance with a further aspect of the present invention, there is provided an apparatus for mitigating pressure disturbances resulting from venting steam from a nuclear reactor into a suppression pool. The apparatus comprises a series of N spargers submerged in the suppression pool, and a header sequentially connecting each of the spargers. The spargers are configured in such a way that when steam is vented into the header from the nuclear reactor, pressure disturbances arising at any two successive spargers to optimize at substantially the relation $$||\phi_i - \phi_{i-1}| - (1 + 2m)\pi| \leq \frac{\pi}{3},$$

where $\phi_i$ and $\phi_{i-1}$ represent phase angles of the disturbances at two successive spargers, i is an integer greater than one and less than or equal to N and denotes the serial position of the sparger, and m is a positive integer greater than or equal to zero.

DETAILED DESCRIPTION OF THE PREFERRED EMBODIMENTS

The present invention takes into account the interaction of oscillatory pressure disturbances arising at individual spargers during venting of high pressure steam into a suppression pool. The individual spargers are connected in series so that a time delay exists between first venting of noncondensable gas from successive spargers. This time delay can be adjusted so that the pressure disturbances from successive spargers are out of phase, partially or wholly canceling one other. This cancellation of oscillatory pressure disturbances minimizes dynamic loads on the walls of the suppression pool and on structures submerged in the suppression pool.

The cancellation or mitigation of oscillatory pressure disturbances can be seen by examining the interaction of pressure disturbances arising at two or more spargers connected in series, each sparger venting noncondensable gas or steam into a pressure pool. In general, a periodic disturbance can be represented by a Fourier series expansion of sines and cosines. However, for simplicity, we consider periodic disturbances that at any time, t, have the form:

$$p_i = A_i \sin(2\pi f_i t + \phi_i), \quad \text{I}$$

where subscript i is a nonzero positive integer and identifies the sparger, and where $p_i$, $A_i$, $f_i$, and $\phi_i$ represent the pressure, amplitude, frequency (in Hz), and phase angle, respectively, of a pressure disturbance at the ith sparger for $$t > \frac{\phi_i}{2\pi f_i}.$$

First, consider two spargers in series having the same amplitude and frequency, but different phase angle. Without loss of generality, we can set the amplitude and frequency equal to 1 kPa (0.145 psi) and 1 Hz, respectively, in equation I. The total pressure p due to pressure disturbances from the two spargers is then given by expression:

$$p = p_1 + p_2 = \sin(2\pi t) + \sin(2\pi t + \phi_2) \quad \text{II}$$

Substituting into equation II seven different values of the phase angle for the second sparger pressure disturbance $$-0, \frac{\pi}{3}, \frac{2\pi}{3}, \pi, \frac{4\pi}{3}, \frac{5\pi}{3}, 2\pi-$$

results in total disturbance pressure versus time curves shown in FIG. 1A–FIG. 1G, respectively.

Figure 1A:
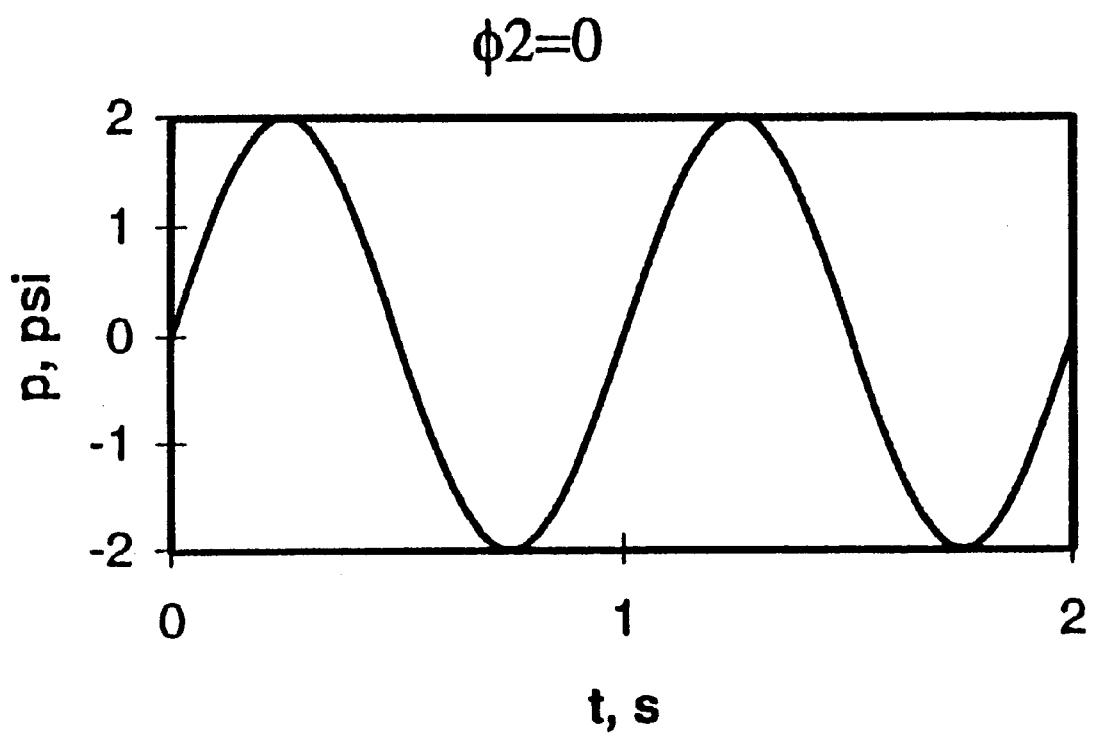
FIG. 1A–FIG. 1G are plots of total disturbance pressure versus time showing the influence of phase angle on harmonic disturbances arising at two spargers connected in series.
Figure 1B:
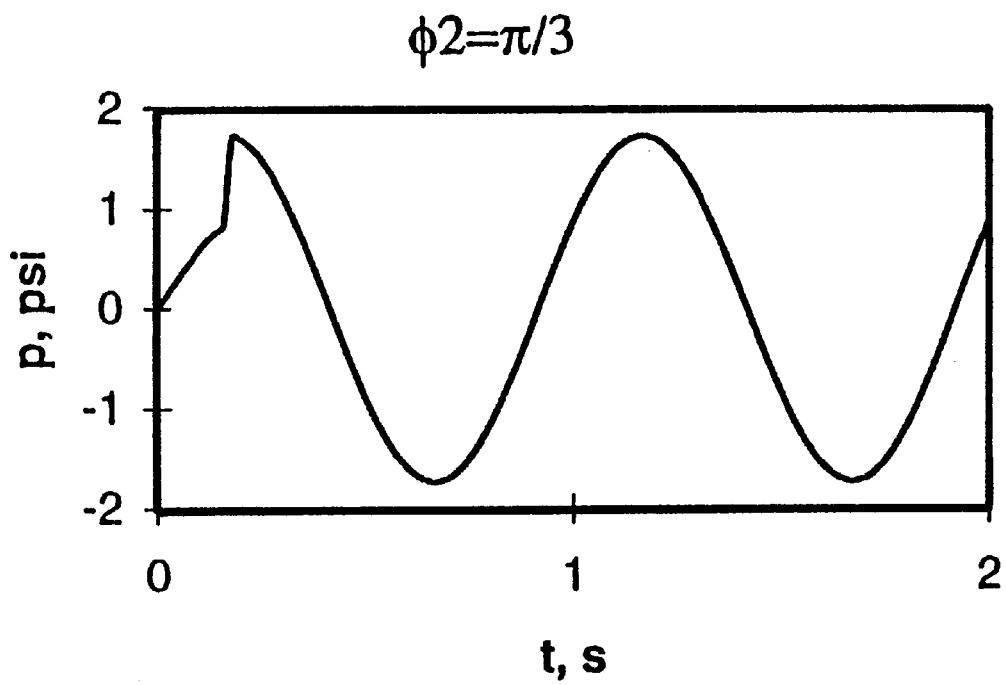
Figure 1C:
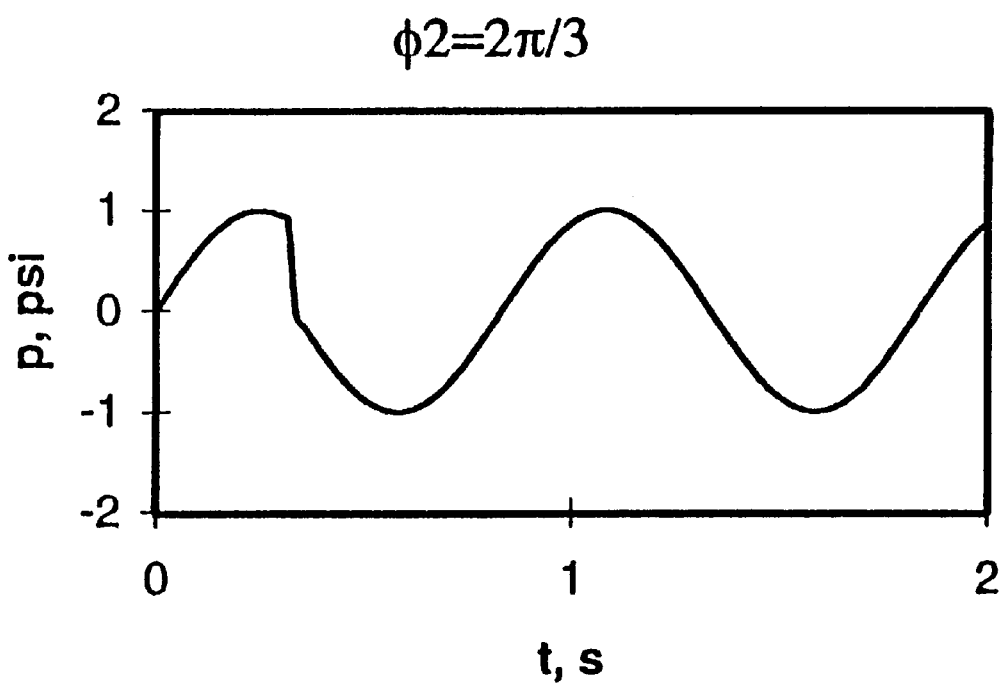
Figure 1D:
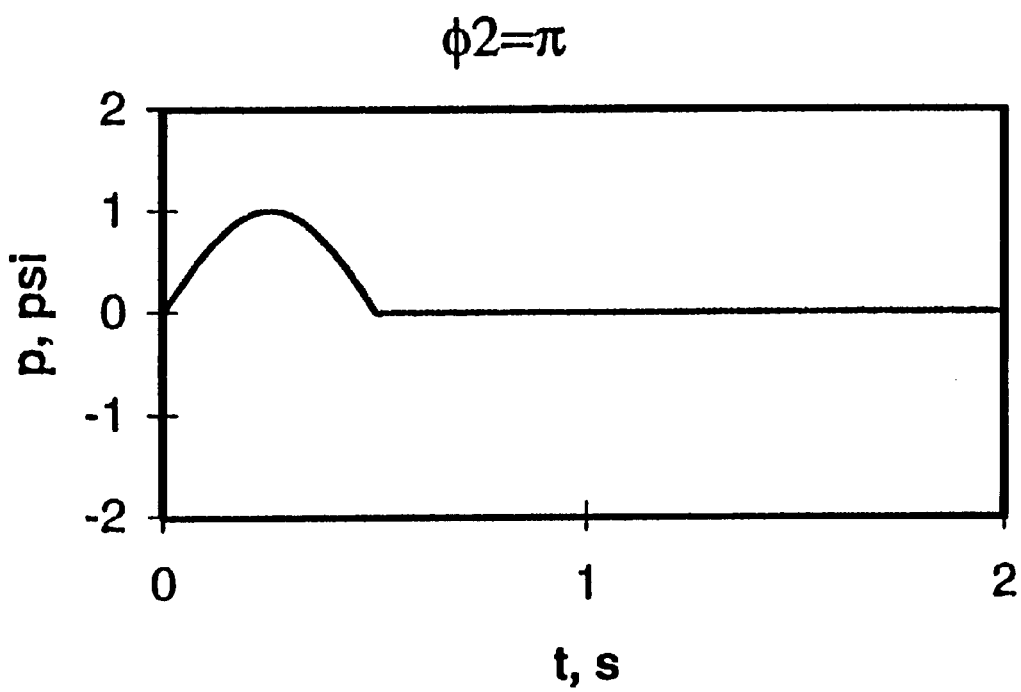

As can be seen in FIG. 1D, when the pressure disturbance from the second sparger is π radians out of phase—i.e., there is a half cycle time delay in gas or steam venting from the downstream sparger—the pressure disturbance from the second sparger completely cancels the pressure disturbance from the first sparger after a half cycle time delay. However, when the second sparger discharges at the same time as the first sparger, as shown in FIG. 1A, or when the phase angle of the second sparger is 2 π radians out of phase with the first sparger, as shown in FIG. 1G, the pressure disturbance from the downstream sparger adds to the first sparger pressure disturbance, resulting in a total disturbance amplitude of 2 kPa. Similarly, as can be seen in FIG. 1B and FIG. 1F, the second sparger pressure disturbance partially reinforces the first sparger disturbance when the downstream disturbance phase angle is, respectively, $$\frac{\pi}{3} \text{ and } \frac{5\pi}{3}$$

radians out of phase with the first sparger.

When the phase angle of the disturbance from the second sparger is $$\frac{2\pi}{3} \text{ or } \frac{4\pi}{3}$$

radians out of phase with the disturbance from the first sparger, as shown in

Figure 1E:
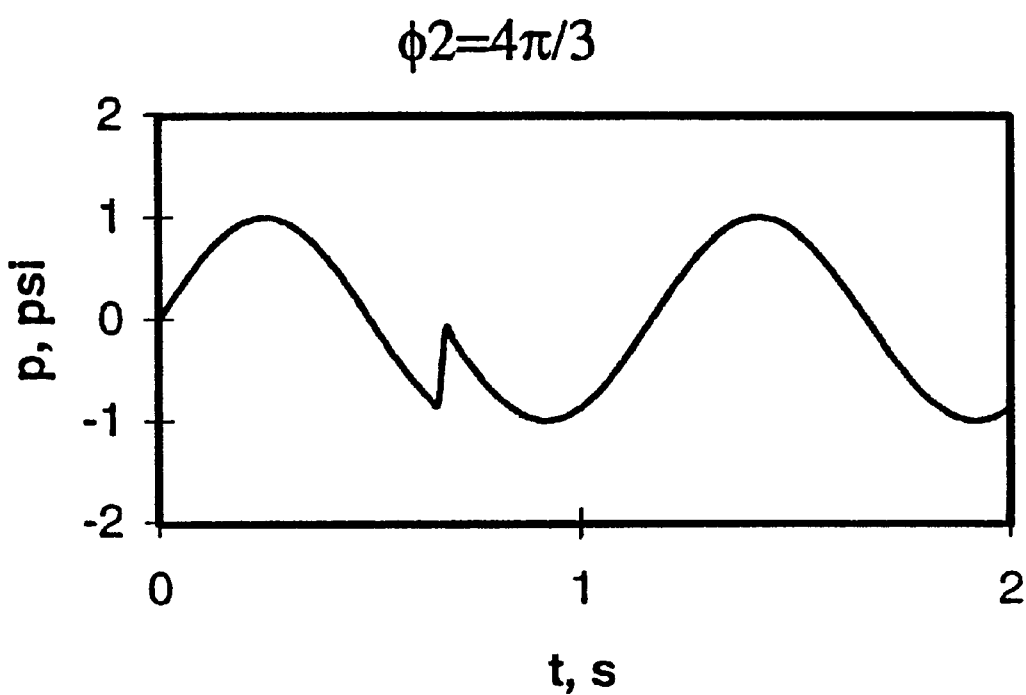
Figure 1F:
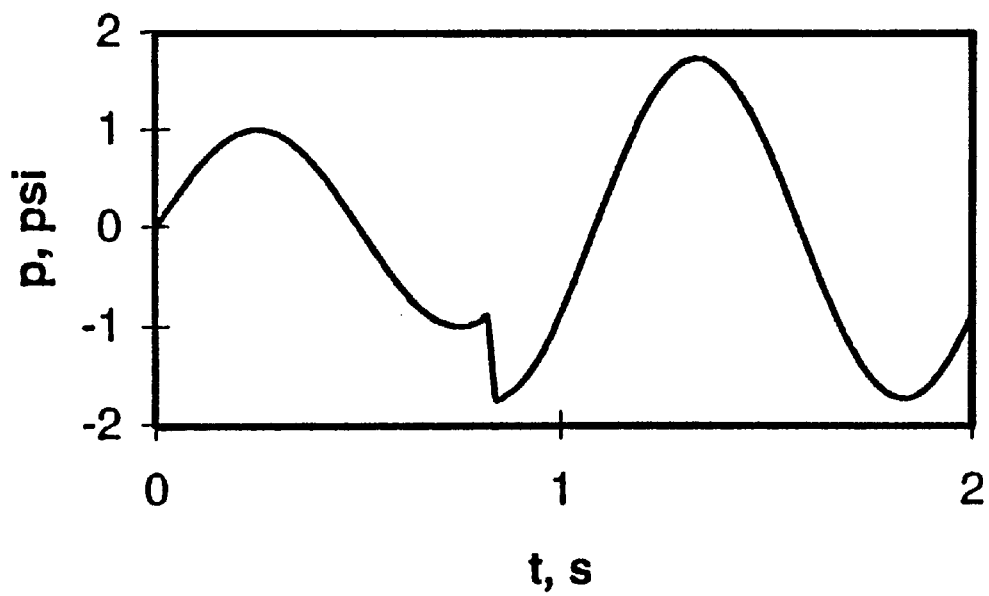
Figure 1G:
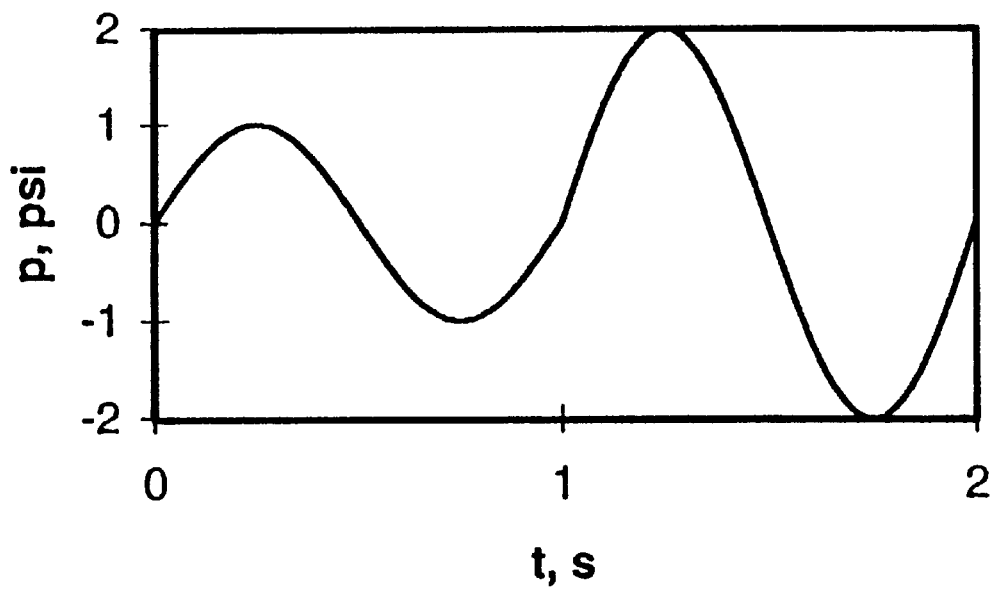

FIG. 1C and FIG. 1E, respectively, the amplitude of the total pressure disturbance is the same as the disturbance from an individual sparger. That is, when $$\frac{2\pi}{3} < \phi_2 < \frac{4\pi}{3}, \quad \text{III}$$

or more generally, when $$||\phi_2 - \phi_1| - (1 + 2m)\pi| \leq \frac{\pi}{3} \quad \text{IV}$$

the interaction of pressure disturbances from the first and second spargers results in a total disturbance pressure that is less than the pressure disturbances from each sparger individually. In equation IV, m is any integer greater than or equal to 0.

Figure 2A:
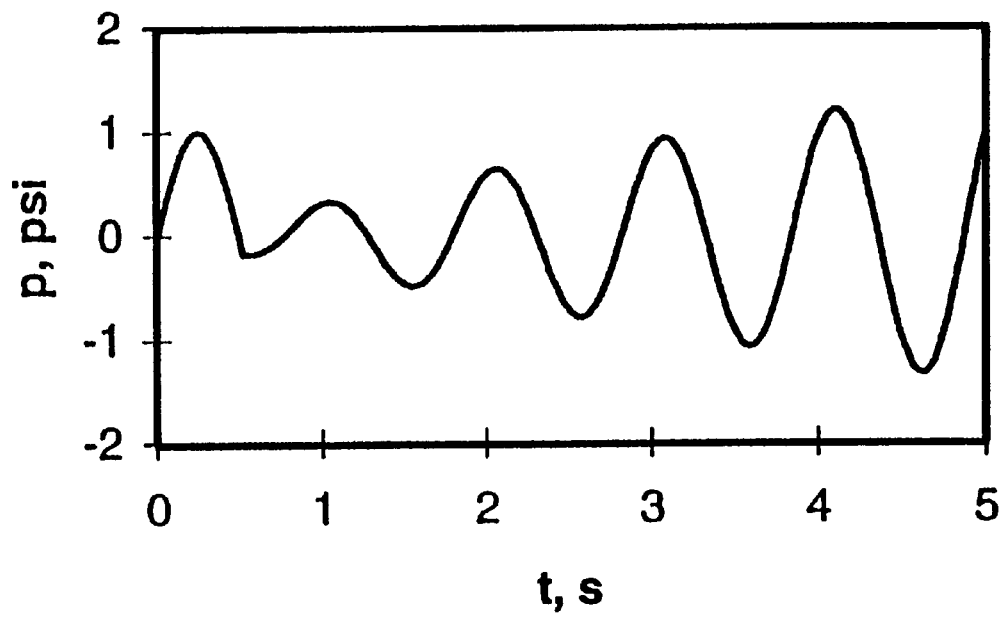
FIG. 2A–FIG. 2D are plots of total disturbance pressure versus time showing the influence of disturbance frequency on harmonic disturbances arising at two spargers connected in series.
Figure 2B:
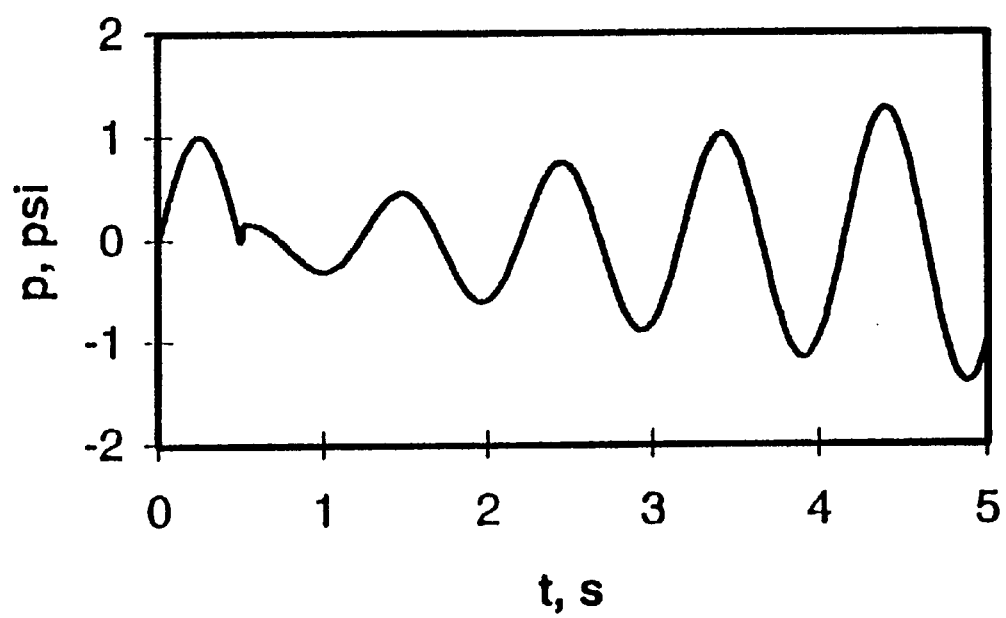
Figure 2C:
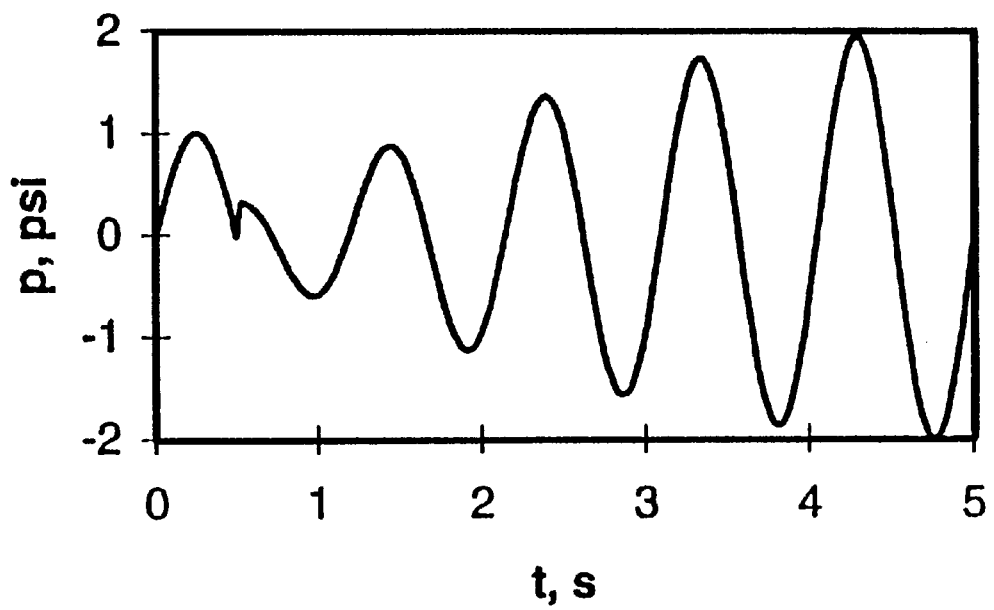
Figure 2D:
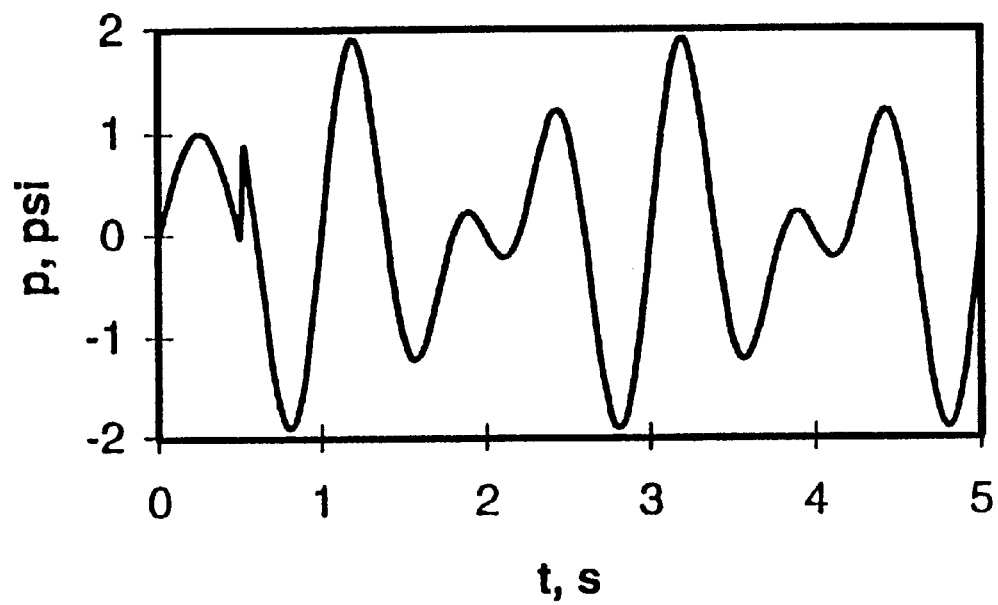
Figure 3A:
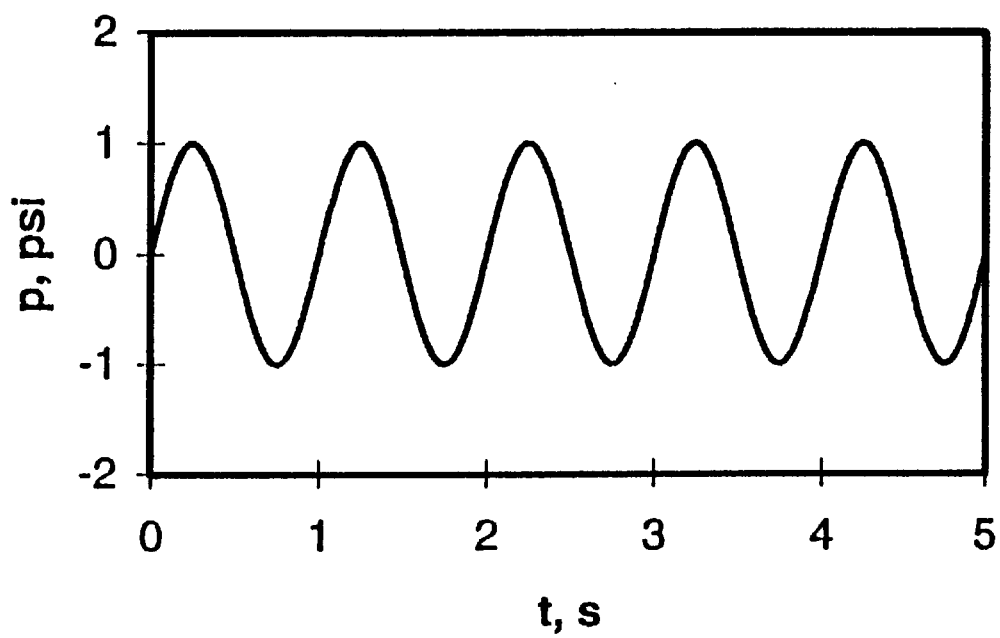
FIG. 3A–FIG. 3F are plots of total disturbance pressure versus time for various numbers of spargers connected in series.
Figure 3B:
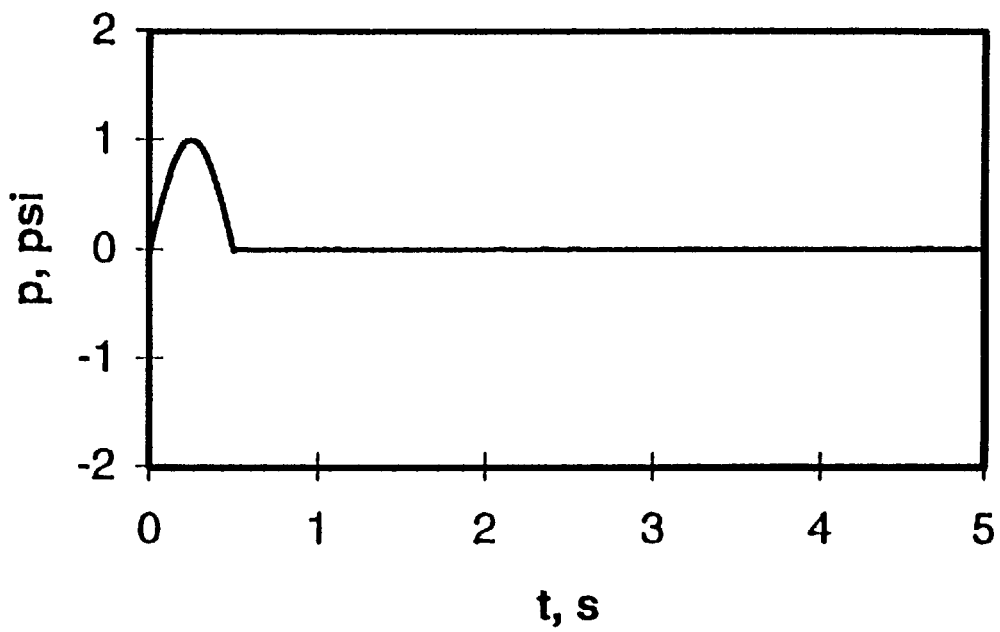
Figure 3C:
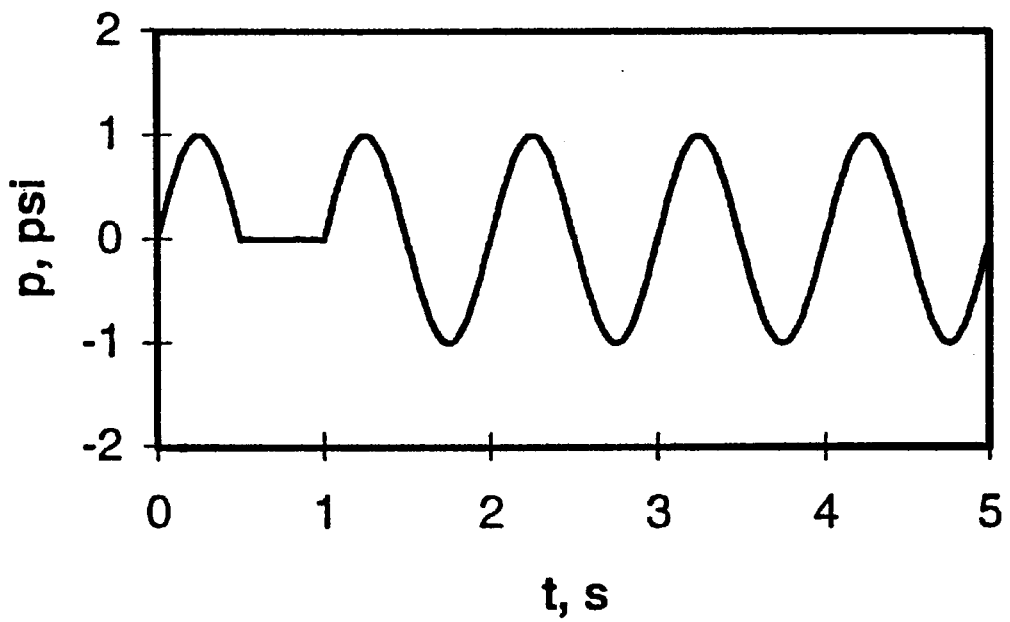
Figure 3D:
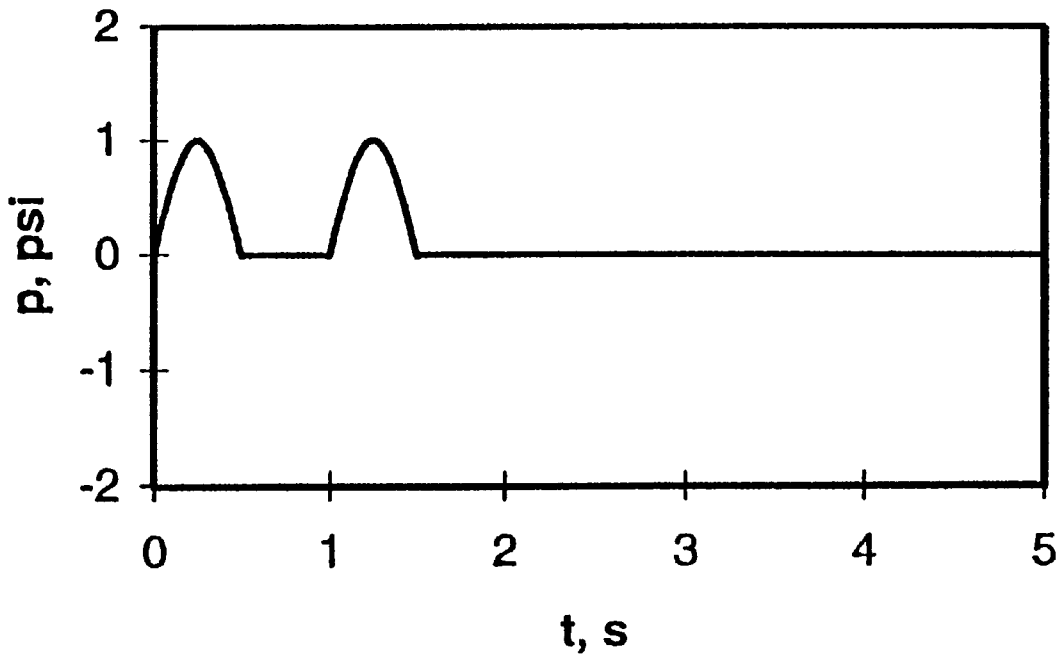
Figure 3E:
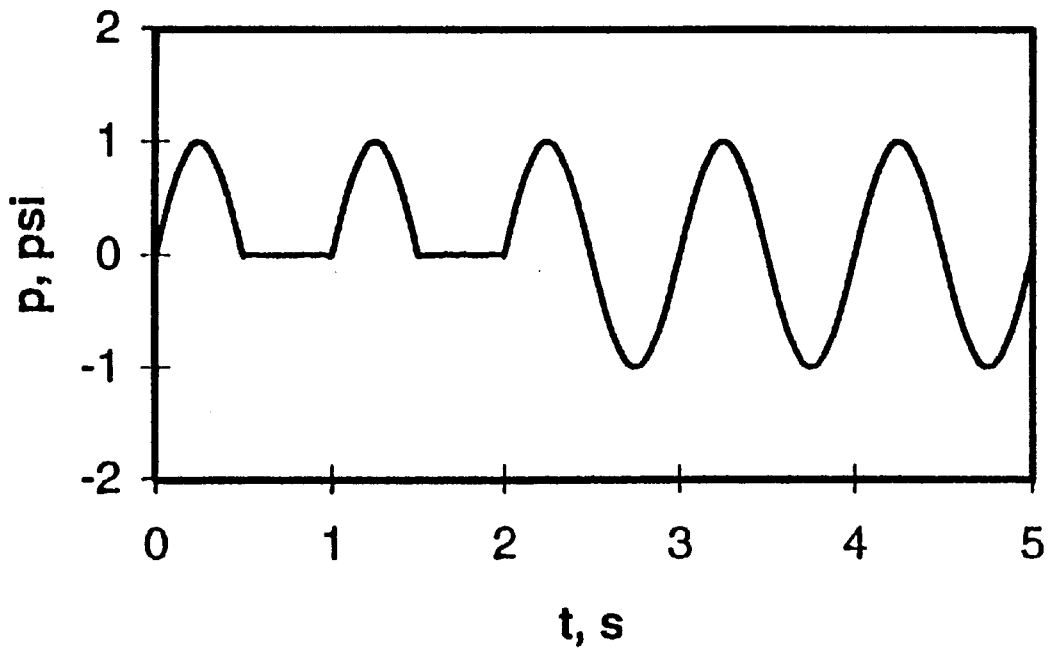
Figure 3F:
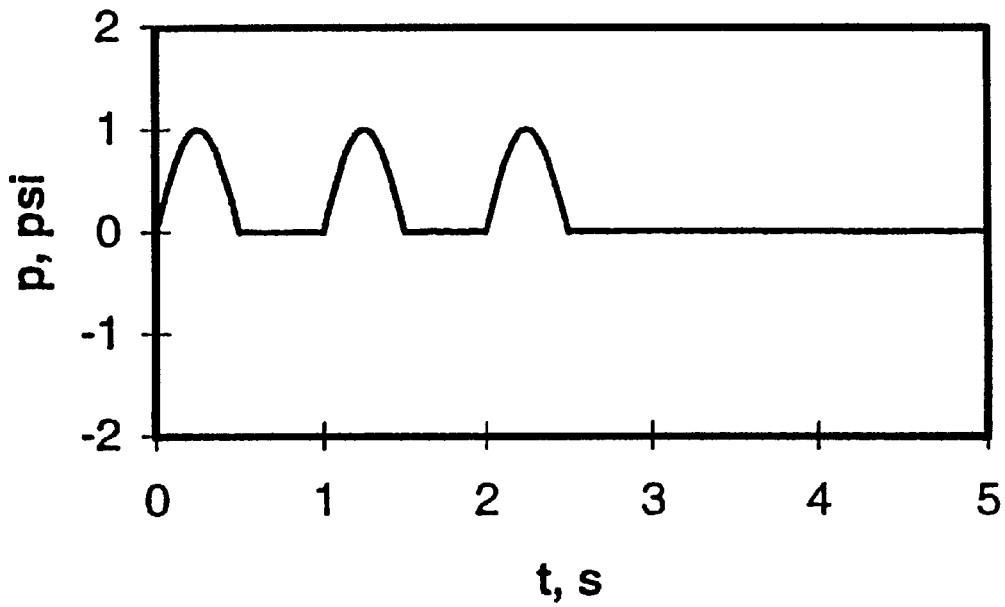

Note however, even if $|\phi_2 - \phi_1| \approx \pi(1 + 2m)$, complete cancellation will not occur, at least for purely harmonic disturbances represented by equation I, if $f_1$ and $f_2$ are not the same. Instead, the total pressure disturbance exhibits a beat frequency. This can be seen in FIG. 2A–FIG. 2D, which plot total disturbance pressure versus time for two pressure disturbances that are π radians out of phase, but have disturbance frequencies $f_1 = 1.00$ Hz and $f_2 = 0.95$ Hz, 1.05 Hz, 1.10 Hz and 1.50 Hz, respectively. When the two frequencies are slightly different, as shown in FIG. 2A and FIG. 2B, a low frequency beat results; at larger differences, as shown in FIG. 2C and FIG. 2D, higher frequencies contribute to the beat.

The results shown in FIG. 1A–FIG. 1G can be extended to more than two sparcers connected in series. For example, FIG. 3A–FIG. 3F show plots of total disturbance pressure versus time for 1, 2, . . . , 6 spargers connected in series, respectively. Disturbances originating at each of the spargers have the same frequency (1 Hz) and pressure amplitude (1 kPa). Comparing FIG. 3B, 3D and 3F with FIG. 3C and 3E reveals that the pressure disturbance is completely nullified for N spargers in series, after an initial time delay, τ, given by $$\tau = \frac{(N-1)}{2f_i}, \quad \text{V}$$

when the number of spargers is even. When the number of spargers is odd, the total pressure disturbance is not completely canceled, but is equal to the pressure disturbance from a single sparger. Thus, one can minimize the overall pressure disturbance by adjusting the time delay between the start of gas or steam venting from two successive spargers so as to satisfy equation:

$$\tau_i = \frac{1}{2f_i} \qquad \text{VI}$$

where $\tau_i$ is the time delay between the ith sparger and the preceding sparger, and $f_i$, is the frequency of the disturbance at the ith sparger.

Generally, it is unnecessary to satisfy equation VI exactly since pressure disturbances from successive spargers can, for certain ranges of phase angles, interact to produce a total disturbance pressure that is less than the pressure disturbances from individual spargers. As can be seen from equation IV, such pressure mitigation occurs when the phase angles of disturbances from successive spargers are $$(1+2m)\pi \pm \frac{\pi}{3}$$

out of phase. This phase difference can be expressed in terms of time delay between gas venting of successive spargers:

$$\left| \tau_i f_i - \left( \frac{1+2m}{2} \right) \right| \leq \frac{1}{6} \qquad \text{VII}$$

where $\tau_i$ and $f_i$ have the same meaning as in equation VI, and where in is any integer greater than or equal to 0.

Figure 4:
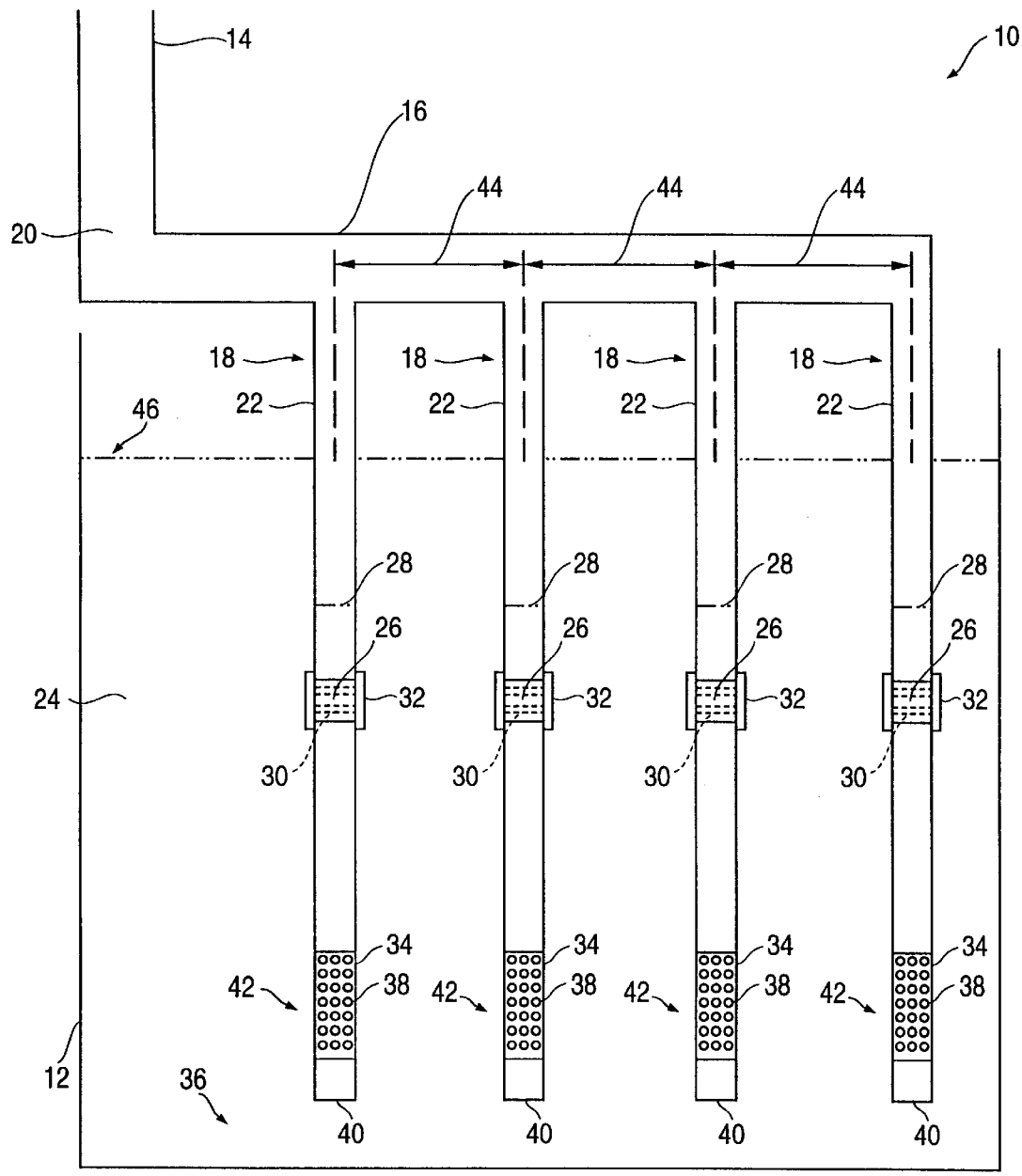
FIG. 4 is a schematic drawing of a train of spargers for a pressure relief system in a nuclear power plant.

FIG. 4 schematically illustrates a sparger train 10 of a pressure relief system for a nuclear power plant, which injects high pressure steam at different locations and times within a suppression pool 12. A pressure relief valve (not shown) vents high pressure steam into an exhaust line 14, which is connected to a header 16. The header 16 channels steam into a series of gas spargers 18. Because the spargers 18 are located at different points along the header 16, vented steam first enters the sparger 18 closest to the header-exhaust line connection 20, and then flows into successive spargers 18 located further downstream from the header-exhaust line connection 20.

As shown in FIG. 4, spargers 18 typically comprise vertical pipes or downcomers 22 that are partially submerged in liquid coolant 24. Each of the spargers 18 shown in FIG. 4 have two sets of nozzles—a first set of nozzles 26 located near the surface 28 of the liquid coolant 24 in the downcomers 22 and consist of rectangular slots 30 surrounded by a concentric collar 32 that deflects gas flow from a radial direction to an axially downwards direction; and a second set of nozzles 34, located near the bottom 36 of the suppression pool 24, which consists of round holes 38 having diameters much less than the inner diameter of the sparger 18 pipes 22. In addition, the ends 40 of the downcomers 22 typically are at least partially open. The head 42 of each sparger 18 is the flow area defined by the second set of holes 34 and the open ends 40 of the downcomers 22. Generally, a sparger comprises one or more sets of nozzles, the sets of nozzles having the same or different geometry, and each set of nozzles located at different positions along the longitudinal axis of the sparger.

Since the spargers 18 are indistinguishable in FIG. 4, the time delay, $\tau_i$, between gas venting of successive spargers 18 depends on the separation distance 44 between the downcomers 22 of each sparger 18, and the fluid flow velocity in the header 16. When the header 16 initially contains gas, the time delay is related to the velocity of a shock wave in the header 16, which results from the abrupt opening of the pressure relief valve, as well as the velocity and pressure of the gas behind the shock wave. Instead of adjusting the separation distance 44 between downcomers 22, one may also adjust the length of downcomers 22 of successive spargers 18 to effect changes in the time delay, although this might also change the disturbance frequency. A time delay for equivalent spargers 18, like those shown in FIG. 4, is calculated in Example 1 below.

In some instances, it will be impracticable to provide the requisite separation distance 44 between the spargers 18. For example, excessive header 16 length may result in unacceptable back pressure in the exhaust line 14 or may aggravate the pressure rise in the suppression pool 12 because of the increased volume of gas contained in the header 16. In such cases, the time delay between successive spargers 18 can be increased by filling the header 16 with liquid coolant 24; i.e., by submerging the header 16 below the surface 46 of the liquid coolant 24 within the suppression pool 12. However, the additional mass of liquid tends to increase the hydraulic resistance of the sparger train 10 and may cause an excessive back pressure at the pressure release valve. A time delay for a submerged header is calculated in Example 2 below.

As noted when discussing FIG. 2A–FIG. 2D, it is generally best to maintain the same disturbance frequency at each of the spargers 18. One can typically alter the disturbance frequency by changing the sparger 18 characteristics. For example, the disturbance frequency from a particular sparger 18 can often be modified by manipulating its submergence depth within the suppression pool 12, or by changing the flow area of the sparger head 42.

EXAMPLES

The following examples are intended as illustrative and non-limiting, and represent specific embodiments of the present invention.

EXAMPLE 1

Time Delay for a Gas Filled Header

As discussed above, and with reference to FIG. 4, the time delay $\tau_i$ between gas venting of successive spargers 18 that are connected in series to a header 16 depends on the separation distance 44 between the downcomers 22 of each sparger 18, and the fluid velocity in the header 16. When the header 16 initially contains gas, the time delay is related to the velocity of a shock wave in the header 16, which results from the abrupt opening of the pressure relief valve. As the shock wave propagates through the stagnant gas (air) in the header 16, it induces gas motion behind the shock wave. Thus, immediately upstream of the shock wave, the air in the header 16 moves with velocity u, which one can determine from the pressure ratio across the shock wave and the speed of sound of the stagnant gas ahead of the shock wave:

$$u = \frac{a_1}{\gamma} \left( \frac{p_2}{p_1} - 1 \right) \left( \frac{\frac{2\gamma}{\gamma+1}}{\frac{p_2}{p_1} + \frac{\gamma-1}{\gamma+1}} \right)^{1/2} . \qquad \text{VIII}$$

In equation VIII, subscripts 1 and 2 refer to regions downstream and upstream of the shock wave, $$\frac{p_2}{p_1}$$

represents the pressure ratio across the shock wave, $a_1$ is the speed of sound of the gas downstream of the shock wave, and $\gamma$ is the ratio of specific heats of the gas in the header 16, which for air at standard conditions is 1.4. The speed of sound in the stagnant gas region ahead of the shock wave can be calculated from the equation $$a_1 = \sqrt{\gamma RT},\qquad \text{IX}$$

where R is the gas constant 0.287 kJ/kg° K. (53.3 ft·lb/lb$_m$·° R.) for air, and T is the temperature of the gas ahead of the shock wave.

Note, limitations on the use of equation VII are described in John D. Anderson, Jr., *Modern Compressible Flow* 172–79 (1982), which is herein incorporated by reference.

In an experimental investigation of a pressure relief system, saturated steam was vented into a water-filled suppression tank through a sparger similar to those shown in FIG. 4. In the study, $$\frac{p_2}{p_1}$$

was about 5, and the temperature and pressure of the stagnant air ahead of the shock was about 311° K. (560° Rankine) and 101 kPa (14.7 psia), respectively. The speed of sound in the stagnant air ahead of the shock wave and the velocity of the gas behind the shock wave were calculated from equations IX and VIII, respectively, and were equal to 354 m/s (1160 ft/s) and 479 m/s (1570 ft/s). Since the measured fundamental frequency $f_i$ of the pressure disturbances was about 10 Hz, one would expect, in view of equation VI, that a time delay of about 0.05 s between first venting of gas of successive spargers would minimize pressure disturbances. This would correspond in FIG. 4 to a separation distance 44 between the spargers 18 equal to about $u\tau_i$=23.8 m (78 ft.)

Because the gas within exhaust line 14, header 16 and downcomers 22 is compressed while the liquid coolant is purged from the spargers 18, the actual value of the time delay may be significantly longer than the calculated time delay, which would result in a decrease in the requisite separation distance 44 between the spargers 18.

EXAMPLE 2
Time Delay for a Water-Filled Header

As noted above, it may be desirable to increase the time delay between successive spargers 18 by filling the header 16 with liquid coolant 24. Again referring to FIG. 4, the time delay $\tau_i$ between gas venting of successive spargers 18 depends on the separation distance 44 between the downcomers 22 of each sparger 18, and the average velocity of the gas/liquid interface moving through the header 16. The velocity of the gas/liquid interface, in turn, depends on the flow rate of liquid coolant 24 (generally water) out of the spargers 18 through the two sets of nozzles 26, 42.

During the line clearing process, the volumetric flow rate q of liquid coolant issuing from each of the spargers 18 into the suppression pool 12 can be approximated by analogizing the process to flow through an orifice. One can then calculate q using the equation:

$$q = \frac{C_D S_N}{\rho} \sqrt{\frac{2\rho(p_s - p_p)}{1 - \left(\frac{S_N}{S_D}\right)^2}}\qquad \text{X}$$

where ρ is the liquid coolant density; $P_s$ and $p_p$ are the average pressures within the sparger 18 and suppression pool 12 adjacent to the sparger nozzles 26, 42, respectively, during line clearing; $S_N$ and $S_D$ are the total flow areas normal to the sparger nozzles 26, 42 and downcomer 22, respectively; and $C_D$ is the discharge coefficient, which approaches 0.61 for high Reynolds number flow. See, for example, R. Byron Bird, Warren E. Stewart & Edwin N. Lightfoot, *Transport Phenomenon* 224–26 (1960), which is herein incorporated by reference.

Data obtained in the experimental investigation described in Example 1 can be used to calculate the requisite separation distance 44 between spargers 18 of FIG. 4. In the experiments, the total area normal to flow in the downcomer and nozzles was, respectively, 0.02 m$_2$ (0.216 ft$^2$) and 0.0118 m$^2$ (0.127 ft$^2$), the collective area of holes, typically 100$_{14\ 150}$, at the downcomer tip. The pressure in the sparger $P_s$ during flow was measured to be about 690 kPa (100 psia), and $p_p$, which is the average hydrostatic pressure in the sparger head, was 203 kPa (29.4 psia). Substituting these data into equation X, and given that the density of the liquid coolant (water) is about 993 kg/rm$^3$ (62 lbm/ft$^3$), and that $C_D$ is 0.61, the volumetric flow rate from the sparger was equal to 0.279 m$^3$/s (9.84 ft$^3$/s).

Thus, to calculate the separation distance 44 between the downcomers 22 of each sparger 18 shown in FIG. 4, we first note that the total volumetric flow rate Q of liquid coolant at the header-exhaust line connection 20 must equal the sum of the individual flow rates in the downcomers 22. If the volumetric flow rates in each of the downcomers 22 are about the same—which is a good approximation since the spargers 18 are identical and they each exhaust into the suppression pool 12 along the same horizontal grade line—the average velocity in the header, $v_H$, is given by:

$$v_H = \frac{-Q}{A_H}\qquad \text{XI}$$

where $A_H$ is the cross sectional area in the header 16.

Since the measured fundamental frequency $f_i$ of the pressure disturbances from the experiments was about 10 Hz, equation VI predicts that a time delay of about 0.05 s between first venting of gas of successive spargers should minimize pressure disturbances. Given that the cross sectional area of the header is 0.0232$^{m2}$ (0.25 ft$^2$), equation XI yields $v_H$=47.9 m/s (157 ft/s), which corresponds to a separation distance 44 between the spargers 18 equal to about $v_H\tau_i$=2.41 m (7.9 ft).

It is to be understood that the above description is intended to be illustrative and not restrictive. Many embodiments will be apparent to those of skill in the art upon reading the above description. Therefore, the scope of the invention should be determined, not with reference to the above description, but instead with reference to the appended claims, along with the full scope of equivalents to which such claims are entitled.

I claim:

1. A method of mitigating pressure disturbances resulting from venting gas through a series of spargers submerged in a liquid coolant that is contained in a suppression pool, the method comprising the steps of:

obtaining fundamental frequencies of the pressure disturbances arising at each of the spargers;

adjusting the time delay between the start of gas venting of two successive spargers so as to substantially satisfy the relation $$\left| \tau f - \left( \frac{1 + 2m}{2} \right) \right| \leq \frac{1}{6},$$

wherein τ represents the time delay and $f$ represents the fundamental frequency of the disturbance at the later venting sparger; and repeating the adjusting step for every pair of successive spargers in the series of spargers.

2. The method of claim 1, wherein the adjusting step, the time delay between the start of gas venting of two successive spargers is about one-half the reciprocal of the fundamental frequency of the pressure disturbance at the later venting sparger.

3. The method of claim 1, wherein the adjusting step, the requisite time delay is achieved by providing an appropriate separation distance along a header connecting successive spargers.

4. The method of claim 3, wherein the adjusting step, the appropriate separation distance is found by obtaining the velocity of fluid in the header prior to gas venting through the spargers.

5. The method of claim 4, wherein the adjusting step, the velocity of the fluid is obtained by determining the gas velocity behind a shock wave traveling in the header.

6. The method of claim 4, wherein the adjusting step, the velocity of the fluid is obtained by determining the liquid coolant flow rate out of the spargers.

7. The method of claim 1, wherein the adjusting step, the requisite time delay is achieved by providing successive spargers that vent gas at different depths in the suppression pool.

8. The method of claim 1, further comprising the step of modifying the spargers so that the disturbance frequencies of successive spargers are about the same.

9. The method of claim 8, wherein the modifying step comprises arranging successive spargers so that they vent gas at different depths in the suppression pool.

10. The method of claim 8, wherein the modifying step comprises providing successive spargers with different flow areas for venting gas.

11. A method of mitigating pressure disturbances resulting from venting gas through a series of spargers submerged in a liquid coolant that is contained in a suppression pool, wherein the total number of spargers equals N, the method comprising the steps of:

obtaining fundamental frequencies of the pressure disturbances arising at each of the spargers;

adjusting phase angles of the disturbances at two successive spargers so that the phase angles substantially satisfy the relation $$||\phi_i - \phi_{i-1}| - (1 + 2m)\pi| \le \frac{\pi}{3},$$

wherein $\phi_i$ and $\phi_{i-1}$ represent the phase angles of the disturbances at two successive spargers, i is an integer greater than one and less than or equal to N and denotes the serial position of the sparger, and m is a positive integer greater than or equal to zero; and repeating the adjusting step for every pair of successive spargers in the series of spargers.

12. The method of claim 11, wherein the adjusting step, the absolute value of the difference in phase angle between the successive spargers is about $\pi$ radians.

13. The method of claim 11, wherein the adjusting step, the requisite relation between the phase angles of successive spargers is achieved by providing an appropriate separation distance along a header connecting successive spargers.

14. The method of claim 13, wherein the adjusting step, the appropriate separation distance is found by obtaining the velocity of fluid in the header prior to gas venting through the spargers.

15. The method of claim 14, wherein the adjusting step, the velocity of the fluid is obtained by determining the gas velocity behind a shock wave traveling in the header.

16. The method of claim 14, wherein the adjusting step, the velocity of the fluid is obtained by determining the liquid coolant flow rate out of the spargers.

17. The method of claim 11, wherein the adjusting step, the requisite relation between the phase angles is achieved by providing successive spargers that vent gas at different depths in the suppression pool.

18. The method of claim 11, further comprising the step of modifying the spargers so that the disturbance frequencies of successive spargers are about the same.

19. The method of claim 18, wherein the modifying step comprises arranging successive spargers so that they vent gas at different depths in the suppression pool.

20. The method of claim 18, wherein the modifying step comprises providing successive spargers with different flow areas for venting gas.

21. An apparatus for mitigating pressure disturbances resulting from venting steam from a nuclear reactor into a suppression pool, the apparatus comprising:

a series of spargers submerged in the suppression pool, wherein the total number of spargers equals N; and a header sequentially connecting each of the spargers;

wherein the spargers are configured in such a way that when steam is vented into the header from the nuclear reactor, pressure disturbances arising at any two successive spargers substantially satisfy the relation $$||\phi_i - \phi_{i-1}| - (1 + 2m)\pi| \le \frac{\pi}{3},$$

wherein $\phi_i$ and $\phi_{i-1}$ represent phase angles of the disturbances at two successive spargers, i is an integer greater than one and less than or equal to N and denotes the serial position of the sparger, and m is a positive integer greater than or equal to zero.

22. The apparatus of claim 21, wherein the absolute value of the difference in phase angle between any two successive spargers is about $\pi$ radians.

23. The apparatus of claim 21, wherein distances between each of the spargers along the header are dimensioned so as to satisfy the relation between the phase angles of disturbances at any two successive spargers.

24. The apparatus of claim 21, wherein the header is filled with a stagnant gas prior to venting steam.

25. The apparatus of claim 21, wherein the header is filled with a liquid coolant prior to venting steam.

26. The apparatus of claim 21, wherein each of the spargers are substantially the same.

27. The apparatus of claim 21, wherein venting depths of the spargers are chosen so that they satisfy the relation between the phase angles of the disturbances at any two successive spargers.

28. The apparatus of claim 21, wherein the spargers are configured in such a way that when steam is vented into the header from the nuclear reactor, pressure disturbances arising at each of the spargers have about the same frequency.

29. The apparatus of claim 28, wherein venting depths of the spargers are chosen so that the pressure disturbances arising at each of the spargers have about the same frequency.

30. The apparatus of claim 28, wherein flow areas for venting steam from the spargers are sized so that the pressure disturbances arising at each of the spargers have about the same frequency.

* * * * *